(12) United States Patent
Jadhav

(10) Patent No.: US 10,873,503 B2
(45) Date of Patent: Dec. 22, 2020

(54) CLOUD DEVICE SYSTEM

(71) Applicant: Ajay Jadhav, New York, NY (US)

(72) Inventor: Ajay Jadhav, New York, NY (US)

(73) Assignee: Ajay Jadhav, New York, NY (US)

( * ) Notice: Subject to any disclaimer, the term of this patent is extended or adjusted under 35 U.S.C. 154(b) by 37 days.

(21) Appl. No.: 16/320,393

(22) PCT Filed: Jul. 25, 2017

(86) PCT No.: PCT/US2017/043742
§ 371 (c)(1),
(2) Date: Jan. 24, 2019

(87) PCT Pub. No.: WO2018/022627
PCT Pub. Date: Feb. 1, 2018

(65) Prior Publication Data
US 2019/0173755 A1    Jun. 6, 2019

Related U.S. Application Data

(60) Provisional application No. 62/366,564, filed on Jul. 25, 2016.

(51) Int. Cl.
*G06F 15/173* (2006.01)
*H04L 12/24* (2006.01)
*H04L 12/28* (2006.01)
*H04L 12/46* (2006.01)
(Continued)

(52) U.S. Cl.
CPC ......... *H04L 41/0843* (2013.01); *G06N 20/00* (2019.01); *H04L 12/28* (2013.01);
(Continued)

(58) Field of Classification Search
CPC ..... G06F 9/445; H01L 41/0843; H01L 67/02; H01L 67/42; H01L 67/125;
(Continued)

(56) References Cited

U.S. PATENT DOCUMENTS

2014/0359552 A1   12/2014   Misra et al.
2015/0169340 A1*   6/2015   Haddad ............... G06F 9/45533
                                                                  718/1
(Continued)

FOREIGN PATENT DOCUMENTS

EP        3488563 A1     5/2019
JP     2019-534489 A    11/2019
(Continued)

OTHER PUBLICATIONS

International Search Report and Written Opinion dated, Aug. 21, 2017, in International Patent Application No. PCT/US2017/043742, filed Jul. 25, 2017.
(Continued)

*Primary Examiner* — Frantz B Jean
(74) *Attorney, Agent, or Firm* — Wiley Rein LLP

(57) ABSTRACT

The present embodiments provide creation and replacement of at least one physical device with at least one fully functional standalone software service API on a connected network, which then functions as at least one remote Cloud Device. An embodiment provides a method for embedding at least one software application inside at least one fully functional standalone software services API, which works as at least one remote Cloud Device. Another embodiment creates internal Cloud-based computer models of machine state altering triggers, as Cloud-enabled network nodes, from events such as user interactions, data synchronization, state transitions, changes in device density, or location-, time- and schedule-based triggers, machine learning algorithms, etc. For example, these triggers provide machine state-altering mechanisms in a Cloud Device that allow a novel and unique approach for dynamic discovery, provisioning, management, and operation of at least one Cloud Device as a machine-state-transition.

23 Claims, 11 Drawing Sheets

(51) Int. Cl.
  *G06N 20/00* (2019.01)
  *H04L 29/06* (2006.01)
(52) U.S. Cl.
  CPC ...... *H04L 12/4625* (2013.01); *H04L 41/0273* (2013.01); *H04L 41/16* (2013.01); *H04L 63/10* (2013.01); *H04L 67/42* (2013.01)
(58) Field of Classification Search
  CPC . H01L 12/4625; H01L 41/16; H01L 41/0273; H01L 63/10; H01L 12/28; G06N 20/00
  USPC .......................................................... 709/223
  See application file for complete search history.

(56) References Cited

U.S. PATENT DOCUMENTS

2016/0277532 A1* 9/2016 Lee .................... H04L 67/02
2017/0124487 A1* 5/2017 Szeto ................ G06F 11/1448

FOREIGN PATENT DOCUMENTS

WO   2016/038374 A1   3/2016
WO   2018/022627 A1   2/2018

OTHER PUBLICATIONS

"Extended European Search Report received for European Patent Application No. 17835123.5, dated Jan. 8, 2020", 11 pages.
"International Preliminary Report on Patentability received for PCT Patent Application No. PCT/US17/43742, dated Feb. 7, 2019", 06 pages.
Kovatsch et al., "Californium: Scalable Cloud Services for the Internet of Things with CoAP", International Conference on the Internet of Things (IOT), IEEE, Oct. 6, 2014, pp. 1-6.
Zhou, Honbo, "The Internet of Things in the Cloud: A Middleware Perspective", CRC Press, Oct. 29, 2012, 15 pages.

* cited by examiner

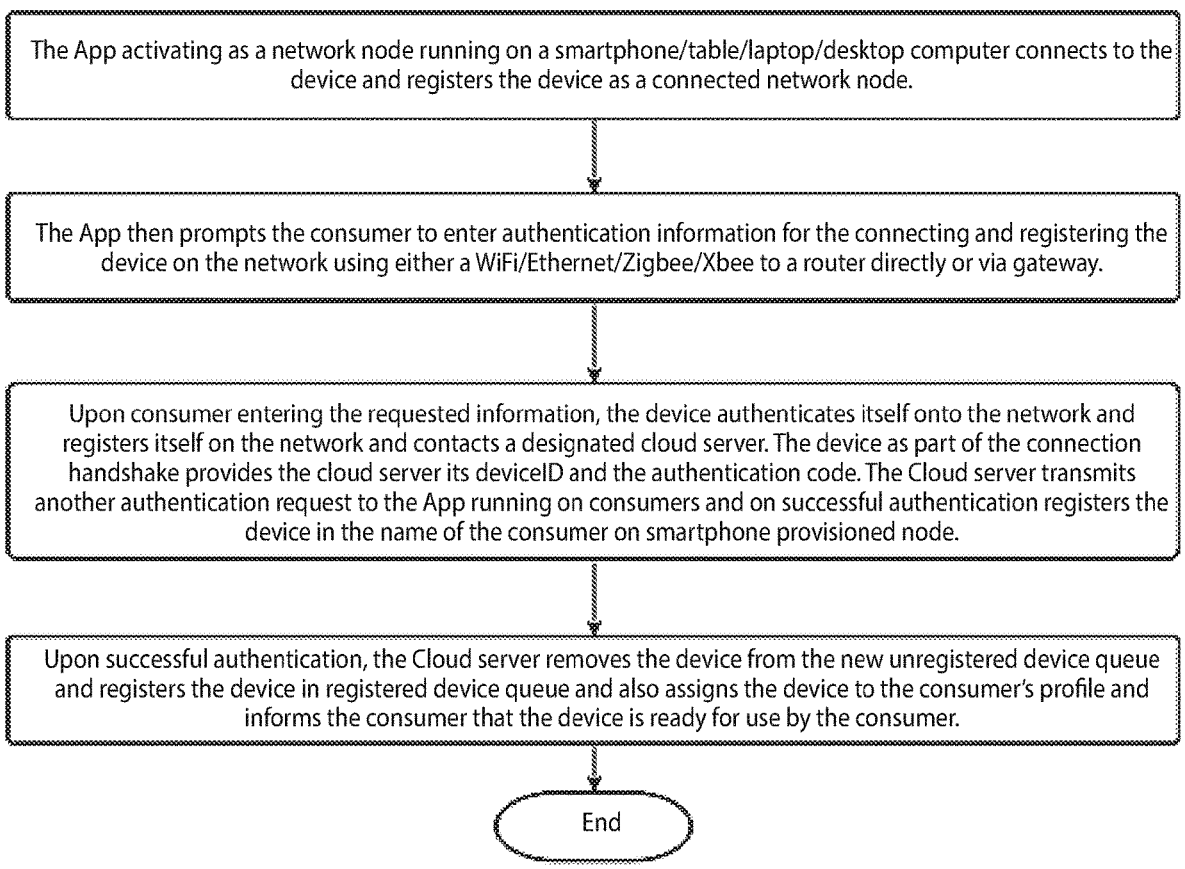

CLOUD DEVICE SYSTEM

RELATED APPLICATIONS

This Application is a § 371 National Stage Application of PCT/US2017/043742, filed Jul. 25, 2017, which claims priority benefit of U.S. Provisional Patent Application No. 62/366,564, filed Jul. 25, 2016, which applications are incorporated entirely by reference herein for all purposes.

BACKGROUND

Further Cloud Devices and Cloud Device-based functionalities are needed.

SUMMARY

A Cloud Device is a network-connected Cloud-enabled software service node representing the internal process flow as a machine-state or combination of machine-states. The present embodiments provide methods and techniques that enable creation and then replacement of a physical device or a plurality of devices on a connected network with a fully functional standalone software service application programming interface (API) or a combination of plurality of software services APIs, that work as at least one remote Cloud Device or a plurality of Cloud Devices. Another embodiment provides techniques that enable embedding of at least one software process or an application, or a plurality of processes or applications, inside a fully functional standalone software services API, or a combination of plurality of software services APIs, that function as a remote Cloud Device or a plurality of Cloud Devices. Another embodiment provides an approach/process for creating internal Cloud-based computer models of machine-state-altering triggers as Cloud enabled network nodes, from events such as: user interactions, data synchronization, state transitions, change in device density, or location-, time- and schedule-based triggers, machine learning algorithms, etc., or combinations thereof. Cloud-enabled network nodes can be transported or transmitted across machine boundaries or software applications processes, and are Operating System (OS) agnostic. In another embodiment, these triggers provide machine-state-altering mechanisms in a Cloud Device to provide a novel and unique approach for dynamic discovery, provisioning, management and operation of a Cloud Device or a plurality of the Cloud Devices as machine-state transitions. These machine-state-enabled-embedded Cloud services, as Cloud enabled network devices, enable the definition and achievement of a set of calibrations of environmental, health and physical standards, in its singularity or a plurality, that represent a myriad of healthy living conditions. In another embodiment, a Cloud Device with its machine-state reflecting the current calibration of various environmental factors can represent one or a combination of Cloud-enabled trigger nodes and machine-states, thereby creating a new and unique Cloud Device that, in effect, causes state transitions in and of itself or through other Cloud enabled network nodes that, in turn, can generate machine-state-altering actions to pass onto various other Cloud-enabled network nodes representing environment controlling equipment, thus bringing about a change in the calibration of various environmental factors to conform with yet another set of Cloud-enabled network nodes with machine states that represent computer models regarding living conditions.

In the Internet of Things (IOT), a Thing may be, for example: a person with a wearable device with a built-in sensor or a plurality of sensors, a collection of physical sensors in a home security system, an automobile with a built-in location sensor or a tire pressure sensor, a software program running as a service, or any other natural or man-made object that can be assigned an IP address and provided with the ability to transfer collected data over a network. In this context, contrary to the general belief that IOT was invented or came about recently, networked computers with IP addresses (the first version of IOT) have existed since the 1980s. Since then, computers have increased computing power in inverse proportion to physical size, and this has led to IOT becoming mainstream. Yet the general industry has not realized the concept that IOT leverages the computing power of the Cloud and becomes even more powerful in what it can do, on its own, even after extracting all of the computing power that can be utilized inside that Thing.

Thus, as known today, IOT is the convergence of interconnected sensors comprising of transducers and the accompanying micro-controller and wireless technologies; this can include smartphones, tablets, laptops, PCs, wearables, data collectors, a software program running as a service, or a data-ingesting Cloud with the ability to store and compute unstructured data along with a network connected controller for transmitting actions to third party systems or equipment. The embodiments described herein provide methods and techniques for a unique and innovative approach that creates an ability to either replace physical aspects of any and all of the above components or functionalities of an IOT with Cloud-enabled software services, or generate brand new services that further this convergence and tear down the silo walls between Mobile Apps, Application Server Software, Hardware, Middleware, etc., to deliver data into a horizontal Cloud comprised of disparate Cloud-enabled services thereby representing a single, seamless offering. An aspect of the present embodiments provides a process that allows unstructured machine-generated data to be stored, analyzed, and computed in a way that was not possible before; and as a consequence, this provides an opportunity to define and build new markets and explore and monetize the business opportunities therein.

The present embodiments define a Cloud Device as a software service representing partial or complete functionality of a network node in a computer network. This capability provides one skilled in the art with the ability to replace a physical device on a connected network, a software program, or a plurality of these programs running on a single or plurality of devices, with a software program (or an application) running as an API-accessible software service that mimics the entire functionality provided by the software program (application), physical device, or plurality of physical devices, with 100% compatibility. This, in turn, provides the capability to combine and then run a plurality of these services on a single physical device as opposed to running multiple physical devices; this has the benefit of reducing network IO clutter, thereby significantly improving throughput. Additionally, this lowers the cost of ownership, operations, maintenance, and servicing of the ecosystem comprising these Cloud Devices. This unique approach creates a myriad of possibilities and opportunities for a new generation ecosystem that can use Cloud Devices, supported by the Cloud, thereby adding new features to the ecosystem not possible before, such as data normalization from disparate sources for data ingestion into the Cloud, dynamic discovery and configuration of Cloud Devices, dynamic provisioning and customization of Cloud Devices, remote administration and management, hierarchical- (role-) and location-based data access, acquisition and transmission, all with encryption.

DETAILED DESCRIPTION

Figure 1A:
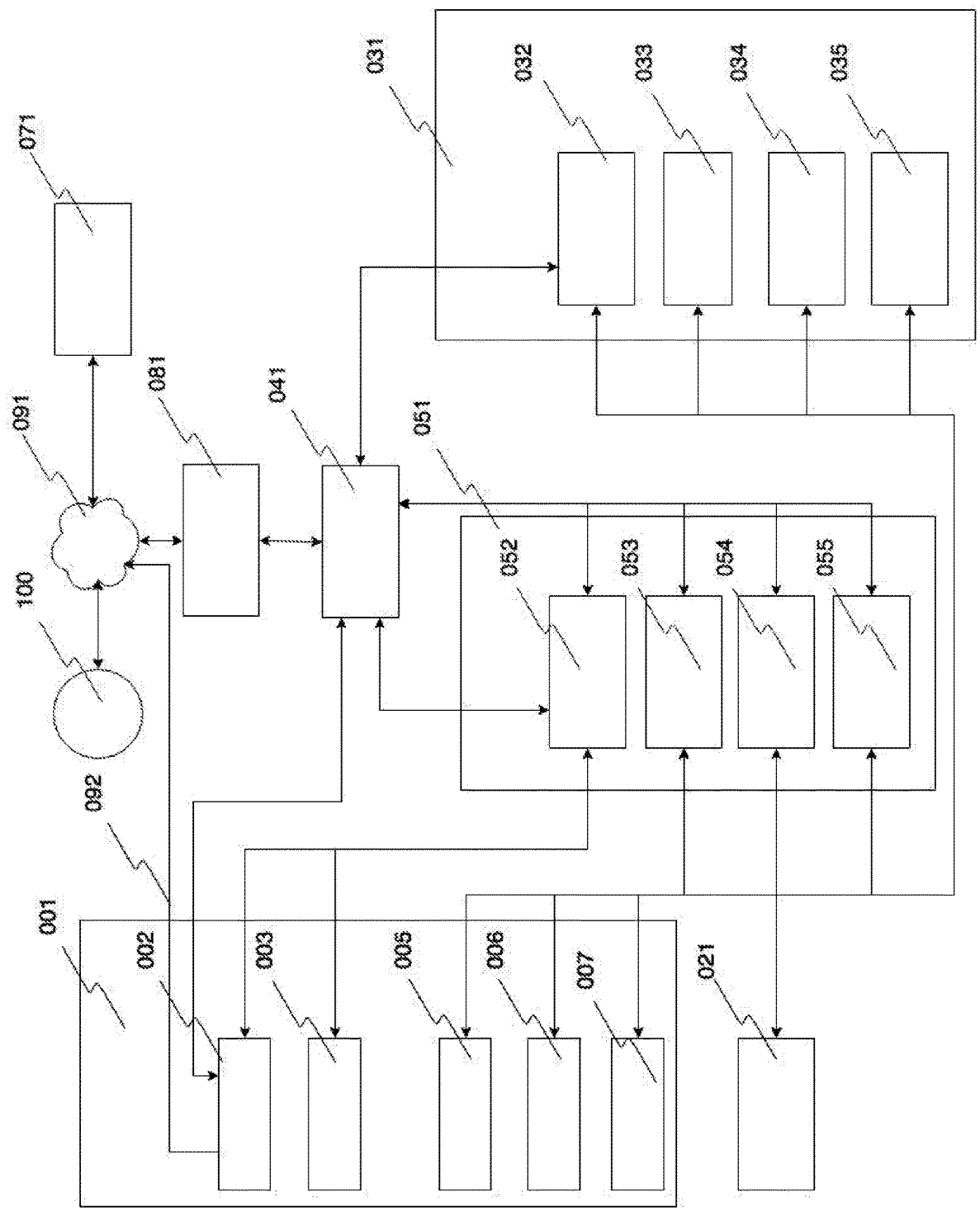
FIG. 1A and FIG. 1B are schemes of a traditional IOT layout.

It should be understood that this invention is not limited to the particular methodology, protocols, and reagents, etc., described herein and as such may vary. The terminology used herein is for the purpose of describing particular embodiments only, and is not intended to limit the scope of the present invention, which is defined solely by the claims.

As used herein and in the claims, the singular forms "a," "an," and "the" include the plural reference unless the context clearly indicates otherwise. Throughout this specification, unless otherwise indicated, "comprise," "comprises" and "comprising" are used inclusively rather than exclusively, so that a stated integer or group of integers may include one or more other non-stated integers or groups of integers. The term "or" is inclusive unless modified, for example, by "either." Thus, unless context indicates otherwise, the word "or" means any one member of a particular list and also includes any combination of members of that list.

All patents and other publications identified are incorporated herein by reference for the purpose of describing and disclosing, for example, the methodologies described in such publications that might be used in connection with the present embodiments, but are not to provide definitions of terms inconsistent with those presented herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on information available to the applicants and do not constitute any admission as to the correctness of the dates or contents of these documents.

With the advent of mobile computing and the ubiquitous use of sensors, every individual in a household or in an office owns or is using many devices, including wearable devices, which are often connected to another device in one way, shape or form, in addition to being connected to a Cloud backend 24×7×365. IOT, in its truest sense, is an ecosystem that encompasses and connects all of these devices individually or as embedded as part of another device (equipment, appliances, etc.), along with controller functions that act as a separate device or is an embedded part of a larger device. This ecosystem architecture is extremely complex and challenging to build, maintain, and manage.

There are many challenges companies face in providing these disparate services in a single ecosystem under one umbrella that is also simple to use and maintain. For example, on the surface, IOT ecosystems are the collections of devices that collect data from the indoor or outdoor environment or from portable and wearable devices that users carry around with them (data producers); or provide output that can be consumed by one of the sensory modalities of a human being, such as a physical display, audio speaker, or a device that performs one of the predetermined mechanical or electrical functions (data consumers). In between these data producers and data consumers lie various types of intermediary devices, such as data collectors, routers, action controllers, gateways, computing engines, storage mechanisms, relays, and switches, just to name a few. Presently, for each of these disparate services the consumer must buy separate devices and spend time and money to acquire, install, and configure these distinct devices to achieve a functional home automation/IOT ecosystem. Depending on functionality, each device has a specialized physical connector that may or may not be compatible with another; devices currently make use of a myriad of network connection protocols, such as, WiFi, MQTT, Ethernet, LPBT, Cellular, 3G, 4G, LTE, any and all of which may have interconnectivity issues. Further, each device usually requires a separate power source, which, in the end, creates a mangled mesh of wires and requires enormous amounts of power with a high cost of maintenance. Additionally, these many devices may have data models that may be proprietary, thereby creating conflict with other devices in the ecosystem.

Additionally, the sensors for the IOT market have matured over the past few years due to the multifold increase in computing power that has provided an opportunity to embed sensors or "smart sensors", as they are called, into equipment of all sizes: from the largest ocean liners to tiniest of wearables devices to even micro-sensors in environmental cleaning equipment. This increase in computing power is further complemented by a robust mobile data network. Leading players in the mobile marketplace are expecting a renaissance in the form of over a billion mobile devices with multiples of trillions of data points being generated by their use. This translates into a consumer with all of their home appliances, such as ovens, lights, switches, water flow meters, gas meters, thermostats, HVAC, HUE, cars, doors, alarms or any physical home device, being enabled as Things in the IOT. Each of these appliances, devices and systems, along with their control mechanisms (the physical control device and the protocol), could be made by different manufacturers and therefore, may be incompatible with one another. This reveals the need for an IOT resource management system as provided by the present embodiments.

In sum, whether the consumer is an individual at their home or an organization attempting to use an interconnected system at its office(s), installing, configuring, provisioning, managing, upgrading, and maintaining current ecosystems is highly problematic. This shortcoming, along with the acquisition costs and integration of multiple devices and their associated control mechanisms, has hampered a true market adoption of the IOT ecosystem for home automation, security, and healthy living. Various embodiments described herein provide methods and techniques to create a single seamless ecosystem at one or a plurality of locations for dynamic discovery, provisioning, management and operation of a network resource using an event, data synchronization, state transition, configuration, device density, orientation, location, and time based scheduler as state controlling triggers.

Cloud Device

The components in an IOT system can be broadly categorized as Data Producer (DP), Data Collector (DC), Data Transporter (DT), Data Ingestor (DI), Data Controller (DN), Action Executor (AE), and Message Notifier (MN). In the present embodiments, methods and techniques describe a unique approach to create a fully functional standalone software service with an API for external clients to access the service as a network-enabled software service node, thereby enabling the deployment in the Cloud as a Cloud Device. The main difference between a Cloud Device and a traditional standard software service is that the Cloud Device, on its own, implements only a limited-to-partial, lightweight functionality provided by a physical device, running in a self-contained OS container, such as Docker. The rest of the needed functionality, which requires robust computing, is taken away from the Cloud Device and implemented on the backend Cloud infrastructure. The data is then accessed by the Cloud Device via a low latency Cloud Client Access API (CAPI) that is internal to the Cloud Device and inaccessible to the external client except where such functionality is implemented purposefully for additional benefits to the IOT ecosystem. Certain embodiments exemplify in detail this low latency CAPI access mechanism that is implemented by using an event-based mechanism that uses a TCP/IP socket. The Cloud Device connects to the backend Cloud by using this dedicated TCP/IP socket or a socket over http or through a low latency responsive REST (representational state transfer) API. Only a context switching event-based backend Cloud can support this kind of low latency functionality required to partition the functionality into two distinct processes: one in the Cloud Device and the other on the backend Cloud. In one embodiment, methods and techniques make use of this low latency connection, and enable Cloud Devices that run on significantly reduced computing power and memory requirements as compared with known systems. The embodiments provide methods and techniques that enable Cloud Devices that can replace any of the physical devices connected to a network, such as Data Producer (DP), Data Collector (DC), Data Transporter (DT), Data Ingestor (DI), Data Controller (DN), Action Executor (AE), and Message Notifier (MN). In certain embodiments, business context may justify embedding the functionality of a plurality of physical devices, and the techniques described herein enable this approach. Additionally, a self-contained OS container runs on a more traditional OS and hardware that has the capacity to run a plurality of these Cloud Devices inside of a single OS space on a single physical machine.

Cloud Devices make internal use of machine-states to represent behavior to internal and external actions or triggers from other Cloud Devices or third party systems. Self- or third party-generated triggers are the most common way for Cloud Devices to communicate with one another.

Without the benefit of the low latency connected Cloud backend, which provides a massive compute and storage capacity lacking today within a standalone Cloud Device, it would not be possible to build a lightweight software service representing the Cloud Device. The novel approach described herein creates software programs that reside inside of the software service (or the Cloud Device), and communicates with the Cloud backend using a unique context switching event-based low latency messaging connection; a context switching event-based mechanism provides a super-fast, low-latency, bidirectional communication between the client software residing within the Cloud Device and the backend remote Cloud. By leveraging the bidirectional communication with extremely low latency, this unique client software program is able to carve out the heavy-duty functionality portion of the device into a separate software program that resides on a remote backend Cloud.

In essence, the present embodiments separate the full-functional specifications of a physical device into two distinct software programs running in separate process spaces: the lightweight Cloud Device supported by the massive computing capacity of the Cloud backend. As stated earlier, without the context switching event-based communication mechanism, simply building the Cloud Device would not meet the specifications of a traditional IOT ecosystem. In certain embodiments, methods and techniques make use of the massive computing and storage power of the backend Cloud to empower the low powered Cloud Devices to be more powerful, more economical to operate, vastly durable, and more functionally capable than what they would be in a standalone mode.

By replacing a physical device with a Cloud Device to embed multiple embedded services onto a single low-powered, low-maintenance physical device, the present embodiments provide a unique approach for dynamic discovery, provisioning, management, and operation of Cloud Devices in lieu of a plurality of separate physical devices. The embodiments further allow for a single device running a plurality of these Cloud Devices to perform several times better by leveraging the computing and storage power of the backend Cloud. In certain embodiments, these techniques allow for the dynamic runtime update of, for example, firmware, software, business rules, machine learning algorithms, action maps, and computer generated data models that control the state transitions of various services based upon both external and internal inputs.

In certain embodiments, a Cloud Device can operate in the context of: a self-contained embedded OS container; or as one of the processes in an operating system (OS) of a physical machine; or as a process running in a separate Virtual Machine (VM). A Cloud Device, on its own or in plurality, can support one or more network protocols at the same time for communication between various Cloud Devices. In addition, these Cloud Devices have the ability to run on any networked computing device with an OS that supports the Cloud Device container. Cloud Devices can communicate with each other via wired or wireless channels using any standard transport protocol, for example, Ethernet, Wi-Fi, Bluetooth, Bluetooth LE, ZigBee, MQTT, Bacnet, etc.

Figure 1B:
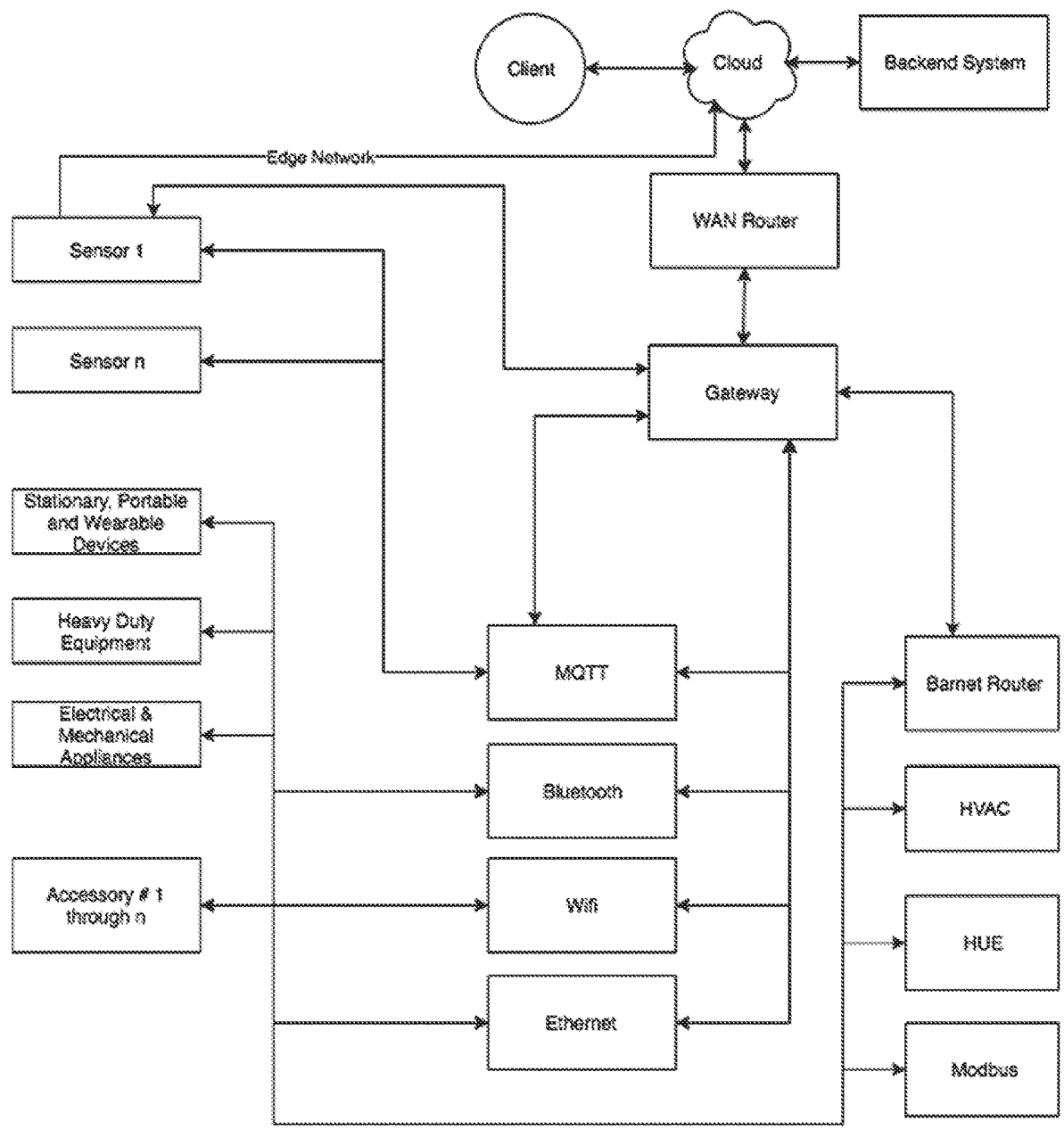

FIG. 1A and FIG. 1B show an example of a current, traditional building environment for building automation. FIG. 1A shows a typical IOT ecosystem setup for a building environment wherein the building environment can be an office workspace or a single-family home dwelling. In a typical configuration of an TOT ecosystem, the setup consists of the following: plurality of sensor devices 002 through 003, plurality of stationary, portable and wearable consumer devices, appliances, heavy duty equipment 005, 006, and 007, together acting as data emitters 001; data accessories 021 that either output notifications to the consumer in some form of an output that appeals to the sensory modality of a human being, or interact with some form of a singular action or a plurality of actions as instructions to be executed by an electronic or mechanical actions by external devices 032-035, collectively referred to as external devices 031 connected to the ecosystem; a gateway device 041 which provides a network connection facility for all components in the ecosystem to the backend system 071; protocol specific collector devices 052-055, collectively referred to as collector devices 051 that collect data from the data emitters 001; a controller device 031 that can upon instruction connect to, individually or as a group or combination, data emitters 001, accessories 021, singular or plurality of collector devices 051, gateway device 041, a remote back end system (directly) 071, which is available for data storage and analysis using via WAN router 081, via the Internet enabled Cloud 091 or through a Cellular network 092. Normally, in a standard run of the mill configuration, a generic user data flow has data emitters 001 emit data to a singular or a plurality of collector devices 051, which in turn, either transmit the data to the backend system 071 using the Gateway device 041, or alternatively, to a controller device 031 that is located locally. In an alternate user data flow configuration, data emitters 001 connect directly to the backend system 071 for storage and/or directly to the accessories 021 that are connected locally to the gateway device 041. In another alternative approach, some products combine the individual functionalities listed above in a hybrid setup, wherein, accessories 021 may act as both a data emitter 001 and as a data display accessory component 021, on the data collector 001 front; some devices currently offer a function wherein a single device is able to collect data from various protocols in a single device and therefore acts as both the collector 051 and the controller 031, however, no universal standard exists in the market today. Some systems do provide storing and reporting functionality via the Cloud via a web and/or an App client 100. FIG. 1B provides additional details of this example.

Currently, the installation, configuration, provisioning, and maintenance of an TOT ecosystem is extremely complex and prohibitively expensive. The IOT industry is in its infancy, as can be deduced by the fact that most of the hardware equipment on the market is singular in function; there are collectors, controllers, and gateways that are incompatible with one another, as well as the incompatibility of the sensors, equipment and appliances that they are supposed to interface with, unless all of the products are provided by a single manufacturer. In the market today, no single manufacturer is able to provide a complete end-to-end solution; and truthfully, compatibility of all components of the IOT ecosystem may never be achieved because of disparate business interests among the various manufacturers. In the industry, certain standards do exist, however, such as, bullet, modes, HVAC, or Hue; but they are still incompatible with one another. Further, there are a multitude of network protocols, such as Wired Ethernet, Wi-Fi, Bluetooth, Low Powered Bluetooth, ZigBee, Xbee, ZWave, to name a few, which confound interoperability. All of this makes the IOT ecosystem a mangled mess, thereby making it difficult to install, configure, provision, and maintain any ecosystem. Whatever solutions may exist in the industry today are still primitive and have a large human component attached to all facets of the ecosystem. This human aspect makes IOT extremely complex, prohibitively expensive, and difficult to configure as depicted in FIG. 1 and FIG. 1B.

In certain embodiments, the methods and techniques described herein provide a unique set of methods and techniques to define, model and implement a traditional IOT ecosystem as an IOT hub, which is comprised of a single Cloud Device or a plurality of connected Cloud Devices for building/home automation. Generally speaking, building/home automation can mean a myriad of things that pertain to various configurations and environments, as well as combinations thereof. In certain embodiments, the methods and techniques described herein provide for a unique approach that with minimal effort defines, models, and then implements these varied configurations using a single software application by using configurable parameters programmed through an application API. In another embodiment, the methods and techniques described herein allow for machine learning algorithms to automatically create, configure, and deploy optimal configurations of an IOT ecosystem for a building/home, based on the physical characteristics of a given subject (building/home). Broadly, these embodiments divide the IOT ecosystem for automation into two broad categories: enterprise office building structures and individual consumer home structures. Enterprise building structures can be, for example, shops, malls, commercial office spaces, concert and event halls, hospitals, warehouses, community environments, etc.; a consumer home structure can be, for example, a residential building structure, such as single and multi-family homes, apartment complexes, community living facilities, etc.

Figure 2:
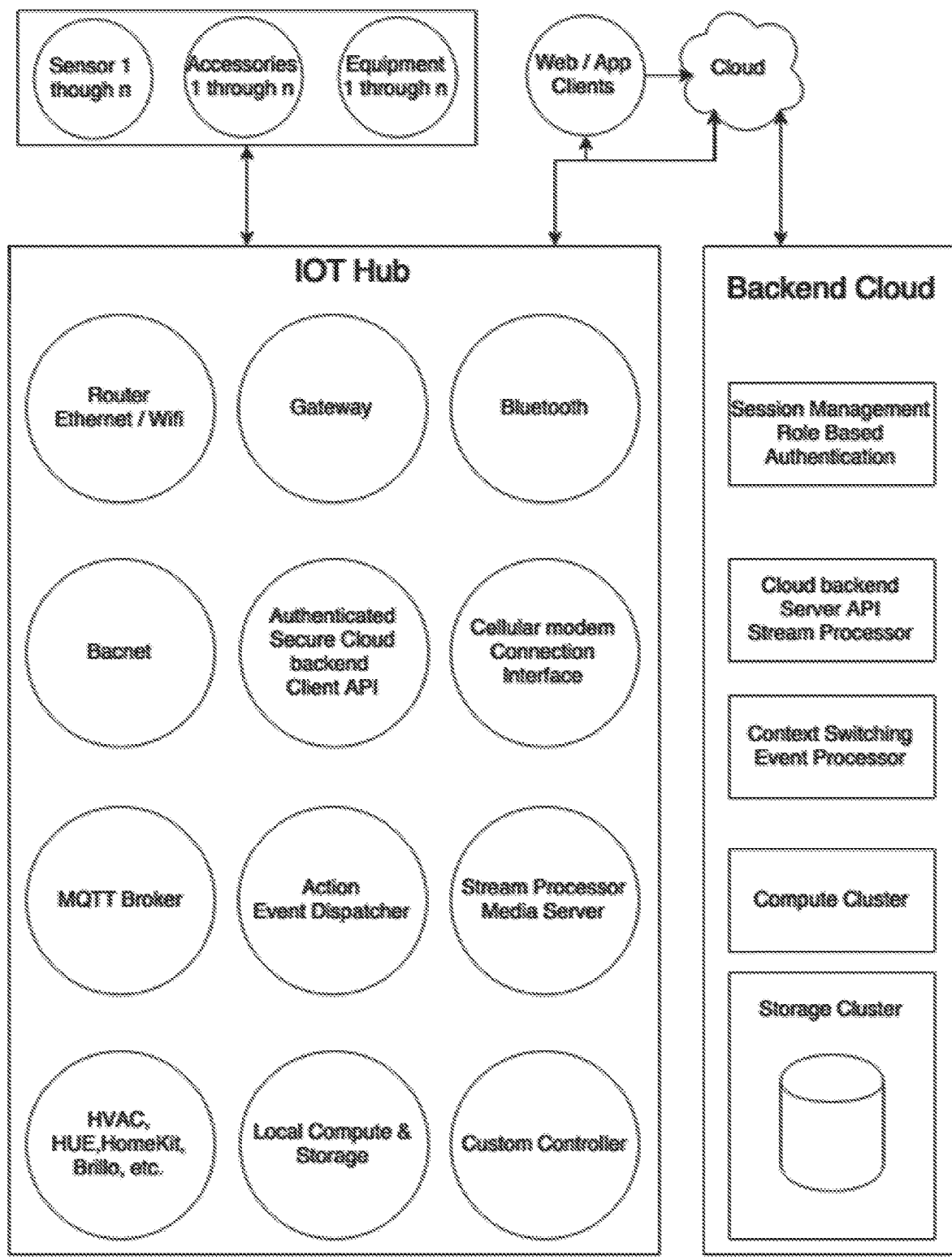
FIG. 2 is a scheme of a traditional IOT ecosystem as an IOT hub.

In certain embodiments, a single application or a software configuration of the application can serve both segments, the enterprise and the consumer, typically referred to herein as Building Structures, as exemplified by the embodiment depicted in FIG. 2, which represents combinations of a singular or a plurality of Cloud Devices (i.e., at least one Cloud Device), thereby creating a unique IOT ecosystem for all facets of automation such as, but not limited to, comfort control, healthy living standards compliance, security, power consumption efficiency, unique custom controls, etc. In addition to the automation of various aspects of Building Structures, various components of the IOT ecosystem (appliances and equipment alike) require services of various kinds, such as, but not limited to, design, configuration, installation, post installation, ongoing maintenance, repair, optimal configuration and conformance services that control and conform various environmental factors to building standards for comfort and healthy living.

Certain embodiments provide a unique approach along with the methods and techniques that enable the replacing of physical devices, protocols or standards with a single low-powered device running a singular or a plurality of Cloud Devices as depicted in FIG. 2. Using the methods and techniques describe in certain embodiments, creating low-powered lightweight Cloud Devices powered by the compute and storage power of the backend Cloud to replace various physical components of a traditional IOT ecosystem such as, collectors, controllers, accessories (051, 031, and 021 in FIG. 1A, respectively), among other components and services, makes the complex IOT ecosystem extremely easy to design, implement, deploy, configure and maintain. Certain embodiments provide the necessary methods and techniques to enable the creation of Cloud Devices that are capable of providing additional functionality that does not currently exist in the marketplace: the ability to service certain aspects of the IOT ecosystem with minimal to no manual intervention. This functionality requires the Cloud Devices to posses a massive compute and storage power that is not possible with traditional physical devices that cannot provide this functionality locally; current devices do not posses massive compute and storage power locally to run self diagnosing or to schedule routines that first analyze the data points and then apply various rule based and machine learning algorithm derived actions. Cloud Devices with their low latency connection to the backend Cloud behave as though they possess the massive compute and storage power locally even though they do not.

This unique and novel approach eliminates the need to acquire, connect and deploy separate devices, which can only individually service one aspect of the IOT ecosystem. The extra burden that comes with adding each individual physical device, namely, the requirements for power, network connection, protocol matching adapters, amongst other things, is completely removed. Functionally, transferring the heavy computing functionality to the Cloud makes these Cloud Devices, although more lightweight in comparison to their physical counterparts, even more powerful. An example of this unique approach is when we allow for the Cloud Devices to access machine learning algorithms for rule based learning and create an action framework for all facets of the IOT ecosystem from the backend Cloud; with the Cloud Devices' low latency, they can exhibit the behavior of having the machine learning algorithms appear resident even though they are located on the backend Cloud. A physical machine without the low latency connection to the backend Cloud that contains the client functionality interface is incapable of executing machine learning algorithms locally.

Making use of a singular Cloud Device or a plurality of these Cloud Devices in a traditional IOT ecosystem is represented in FIG. 2. As compared to the mangled mess of connections and rigid physical devices, FIG. 2 depicts the use of the Cloud Devices, which minimizes and simplifies the implementation, installation and maintenance of such IOT ecosystem.

As depicted in FIG. 2, the IOT hub has a Cloud Device, "Action Event Dispatcher" (AED). Using methods and techniques described herein, the backend Cloud is able to create or receive a list of tasks to be executed in response to a user interaction or a trigger that is generated because of an external or internal machine event, data synchronization, state transition, configuration, device density change, device orientation change, location change and/or a time based scheduler event. AED is able to convert the received or newly created tasks and change them into machine instructions to be dispatched to the backend systems through one of the controller Cloud Devices, such as bacnet, HVAC, HUE, custom controller, etc. To accomplish this, AED sends a machine instruction or a plurality of instructions as state altering triggers to the desired Cloud Device controller, which then takes the instructions and executes routines that are internal to it; however, these internal actions can affect third party systems connected to the Cloud Device. The Cloud backend is able to receive, normalize and store data from third party interfaces in the storage. Once in the data store, the application can interact with the data as if it was created natively within the system, and the application is able to perform any type of operations on it and generate machine state altering triggers from it.

As depicted in FIG. 2, the Application has a Cloud Device that resides in the IOT Hub and represents the local compute component. This is a miniaturized version of its larger counterpart, again, implemented using a Cloud Device that resides on the Cloud backend. IOT Hub is built to account for the loss of connectivity to the Cloud. In such an instance, a local compute and storage engine would kick in and act as the end point for issuing commands. The local compute Cloud Device residing in the IOT Hub ecosystem is constantly in communication with its Cloud Device counterpart on the server side. Computer cluster with its massive compute and storage power is able to create calibration curves, drift correction curves for individual devices, and then dynamically push these rules, updates and enhancements to the local compute on the IOT Hub and then onto the devices attached to the IOT Hub locally. In essence, certain embodiments allow for remote devices connected to the IOT Hub locally to be visible and accessible as local devices for the Cloud Device representing the server side compute residing on the backend Cloud.

Figure 3:
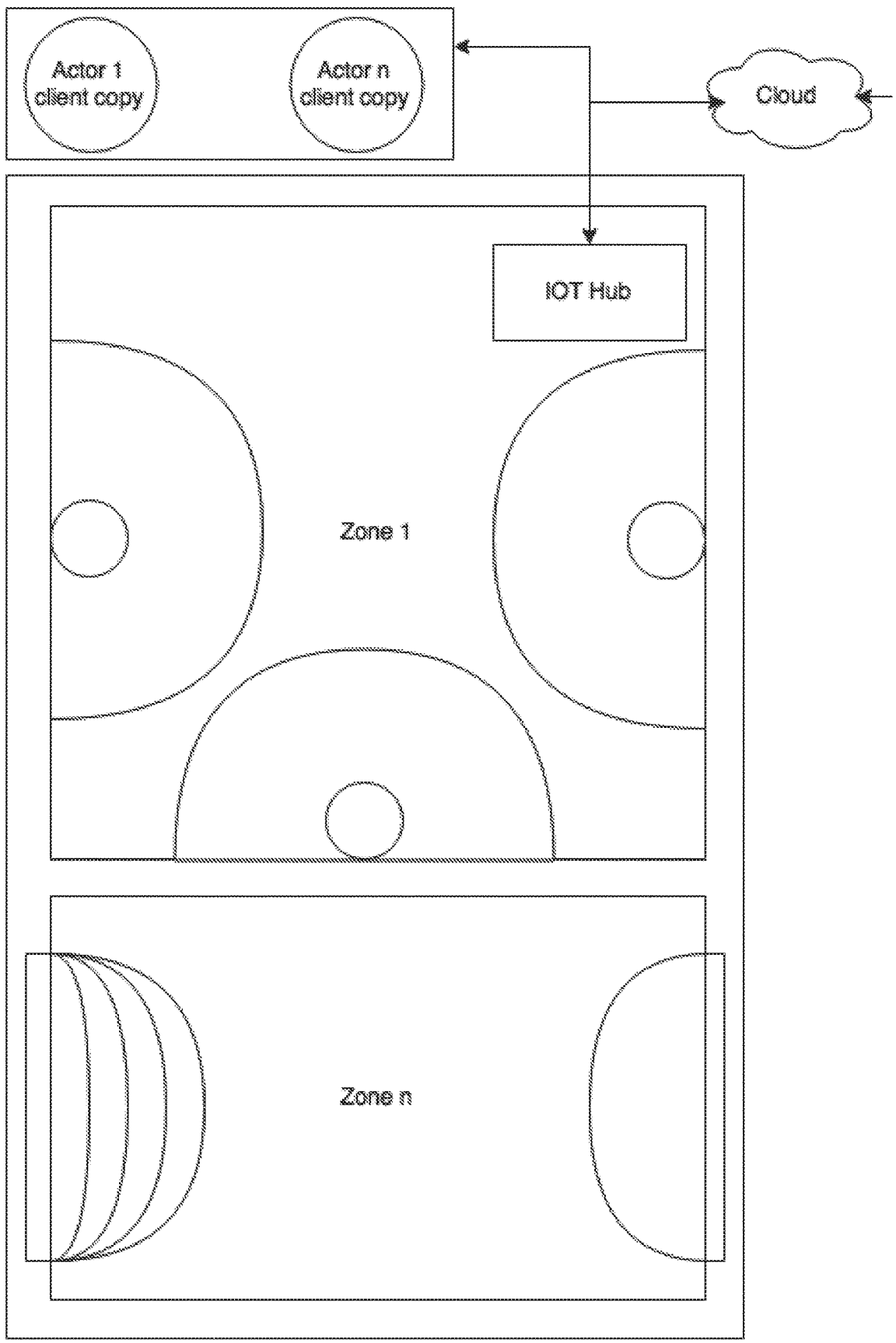
FIG. 3 is a scheme depicting an embodiment of an enterprise and consumer building structure service.
Figure 3:
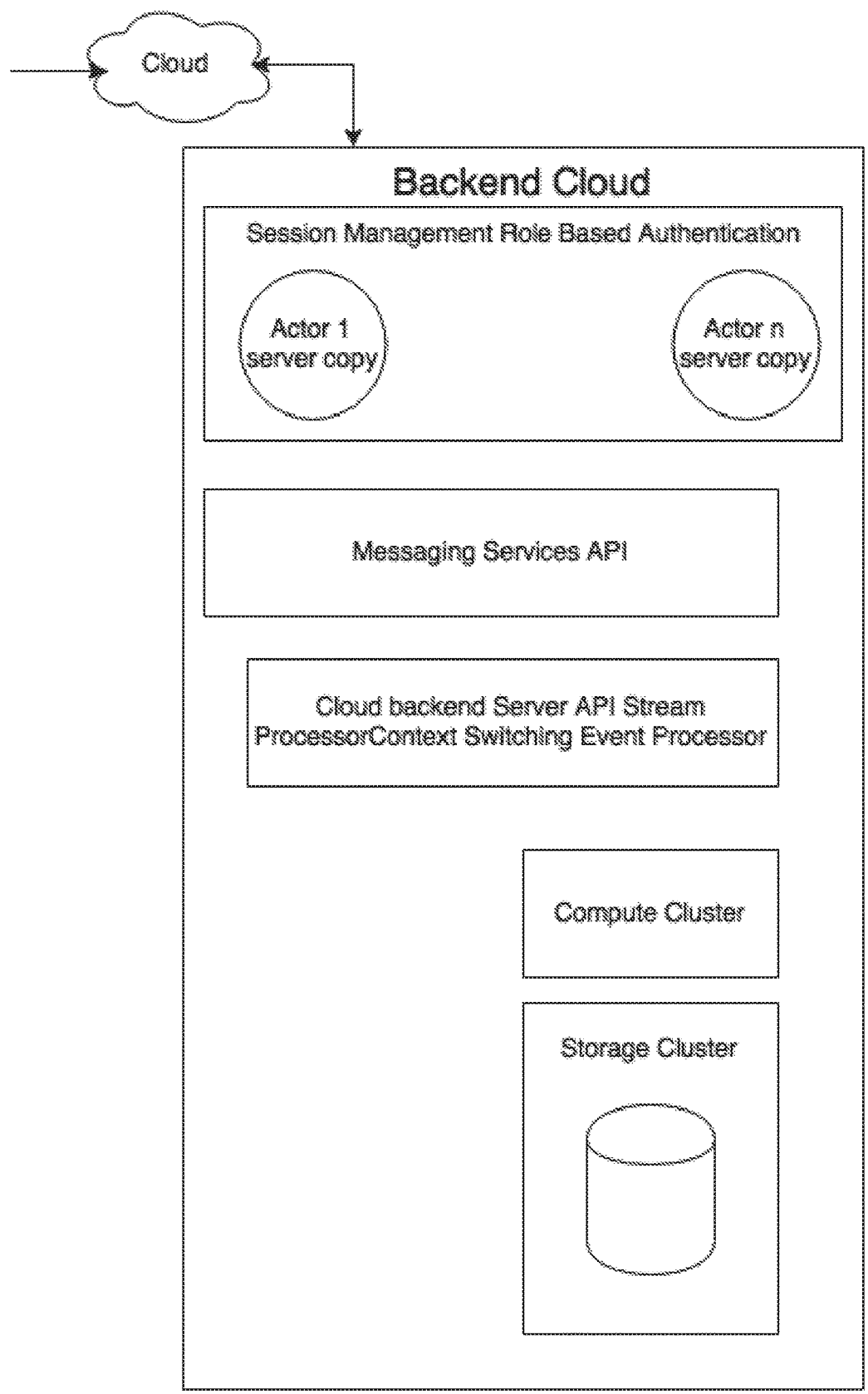
Figure 6:
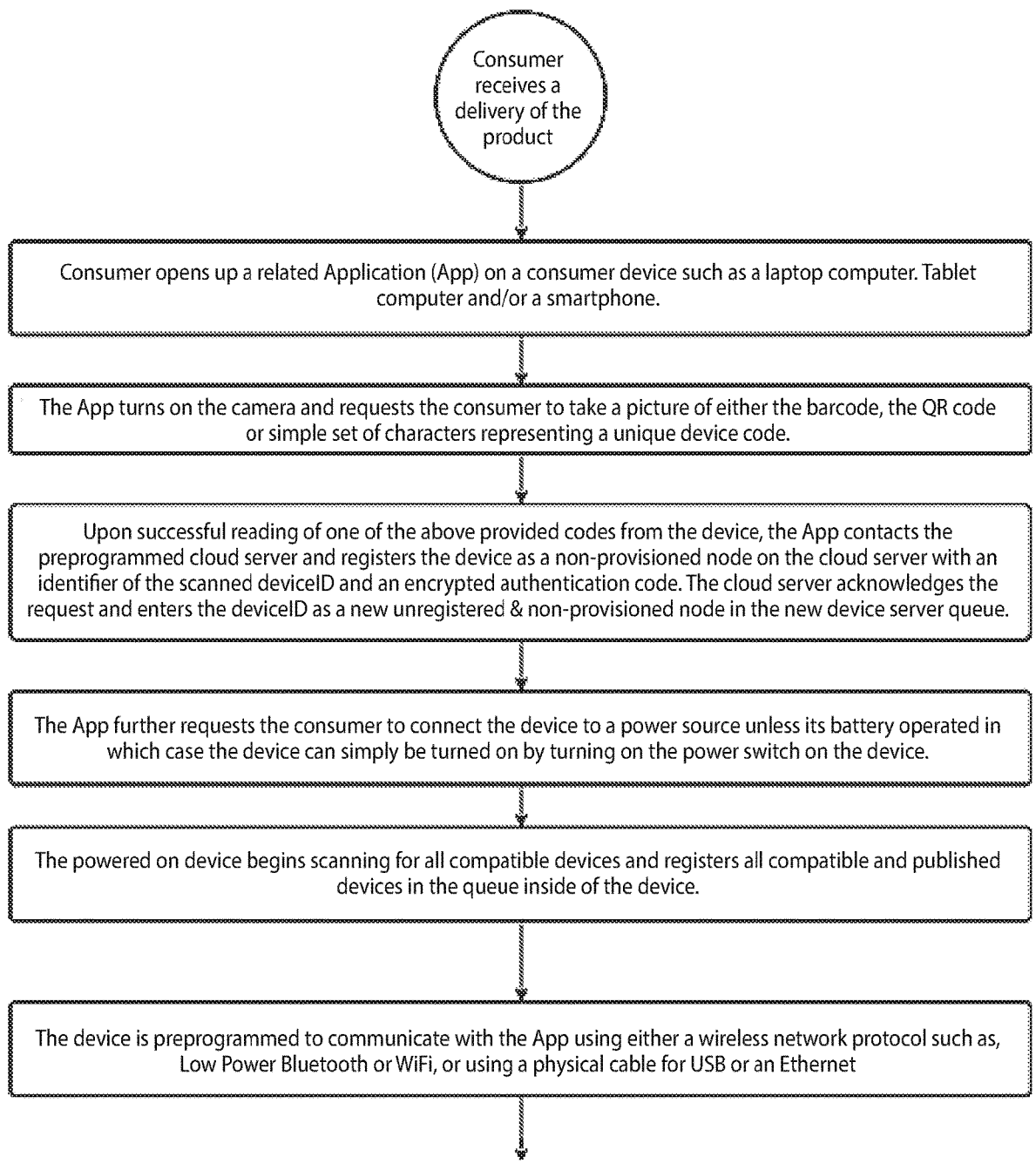
FIG. 6 is a flowchart of an embodiment of an IOT device authentication.

Each IOT Hub upon activation, through a session managed authentication handshake as depicted in FIG. 6, is able to create a unique channel with a unique channel ID for communication with the backend Cloud (see FIG. 3). The backend server Cloud is able to maintain an unlimited number of unique IOT Hub specific communication channels. In certain embodiments, this unique ID based communication channel allows for deploying and identifying the IOT hub as a backup for the primary IOT Hub. With data multiplexing options available on the backend Cloud, both the primary and the secondary Hubs can be in an online mode at the same time without having to account for any additional functionality; this is possible only using a data replication mechanism on the backend Cloud that is communicating and interacting with the Cloud Devices, as opposed to actual physical devices in a traditional setup, which are improved upon by the present embodiments.

In another embodiment, the Cloud backend has a full-fledged calendar and scheduling functionality available in the form of a Cloud Device. In certain embodiments, methods and techniques make use of the Cloud Device calendar functionality to schedule events and calendars specific to the Hub itself or to an individual device, including Cloud Devices built for User Interface Actors, thereby allowing for scheduling both human and physical resources when required. Some of the Cloud Device controllers such as barnet, allow a limited amount of functionality as to the schedule of the devices that are registered using the barnet protocol. In certain embodiments, methods and techniques can be used to wrap these devices inside of a Cloud Device; then using the full-fledged scheduling functionality of the Cloud Device, we can fully sync with the standard scheduling functionality provided by the barnet device. A traditional device without this wrapper is incapable of doing this sync. The same functionality may be achieved by putting the device inside of a barnet capable device, however, such a solution is extremely cost prohibitive and impractical to scale at any Cloud level.

FIG. 3 depicts an IOT Hub supporting a generic building type with relation to area measurements, zones, device heat-map, structure heat-map, geolocation, orientation, user roles, and session management. After deploying an IOT ecosystem, there remains the continuous servicing, maintenance, and monitoring aspect of the system. This is akin to the services provided by companies such as ADT Security, which acts as a service provider that is responsible for servicing, maintaining, and monitoring a home security system. The human component in servicing, maintaining, and monitoring any IOT ecosystem is a significant hurdle, in the sense that any human aspect can render the system error prone and potentially cost prohibitive for mass adoption. Certain embodiments describe the methods and techniques that provide a unique approach for creating Cloud Devices that form the foundation of the servicing aspect of the IOT ecosystem by leveraging underlying services provided by the backend Cloud, i.e., the need to service, maintain, and monitor the IOT Hub. These services can be as follows, but are not limited to: a platform and Operating System; an agnostic chat/text messaging service to send out alerts or notifications to the consumers via an interactive chat message interface thereby allowing for consumers to interact with the alerts or notifications without switching to a dedicated Application; an automatic ticket generation service for reporting erroneous conditions, such as electrical or technical breakdowns, equipment failures; the delivering of notifications and alerts that are triggered and generated by a rule based algorithms; an error preventive action ticket generation service; an automatic ticket generation service for replenishing supplies for various accessories and equipment; notifications and alerts service to deal with drift and automatic corrections; the recalibration for drift correction alerts and updates; emergency services alerts and notifications based on threshold trigger activation; the dynamic discovery of devices, dynamic remote e-delivery of software updates and enhancements, dynamic remote e-delivery of firmware updates; and the service to deal with remote equipment reboots and restarts commands, etc. Certain embodiments provide techniques and methods that allow for the implementation of these example services as they are programmed into Cloud Devices by leveraging the messaging service provided through an API to the users of the IOT Hub. This interface can be accessed locally from the IOT Hub or directly from the Internet (Cloud), as depicted in FIG. 3.

Most, if not all, of the core components of the IOT ecosystem as depicted in FIG. 3 are common to both the enterprise and the consumer environment spaces; the difference between the two is the User Interface actors needed for the servicing aspect of the two environments, which couldn't be more different from one another. In yet another embodiment, and described in detail in FIG. 3, the servicing aspect of these two disparate environments is made extremely simple to implement and maintain by merely adding yet another type of individual Cloud Device in the form of User Interface actors. Capturing the entire functionality of the consumer interaction within the IOT ecosystem can be defined by the role they play in the ecosystem, such as, but not limited to, home owner, head of the household at home, family member, real estate company owner, real estate agent, building supervisor, building owner, building administrator, hotel concierge, human resources personnel in a corporate office building setting, etc. Once all of the encompassing user interface functionality inside of a Cloud Device is captured as a superset, a parameterized based API is provided to further customize these generic Cloud Devices to conform to any additional specific rules for one of the above mentioned roles. Based on the type of building structure, select building standards, environmental setup and any additional customization of role functionality, new roles can be created or defined as new Cloud Devices. Once the Cloud Device for a given role is defined, an unlimited number of users can be attached to that specific role, which mimics the same behavior in terms of permissions and user interaction. In certain embodiments, methods and techniques further provide the ability to create groups or subgroups of users for managing extremely large user/role numbers. This is an extremely useful feature that allows for the allocation and management of hierarchal data access permissions to read/write data.

Certain embodiments provide techniques and methods that allow for consumers or users attached to Cloud Devices to customize or configure user roles to access the session management part of the Cloud Device. This is a powerful feature, making the Cloud Device system location agnostic (web/App client or a server), and therefore allowing the ability to dynamically grant, revoke, or customize user permissions, synchronize data between the web/App client and persistent storage on the server, and deliver notifications and alerts, among other things.

Certain embodiments provide techniques and methods that control the ability to service various types of building structures/environments, including but not limited to, the enterprise and the consumer environments. This is done by first treating any building structure as a single contiguous space, regardless of the size or the characteristics of the building structure or any designated open space. Then depending on the size of the building structure or open space, it is broken down into smaller spaces called Zones as shown in FIG. 3. In any given setup, a given Zone can have a standalone IOT ecosystem of its own or multiple Zones that share a single IOT ecosystem; the determination of this is dictated by a multitude of factors, such as cost, type of space (hospital room, kitchen in a restaurant or a garbage room for a large building), etc.

Figure 4:
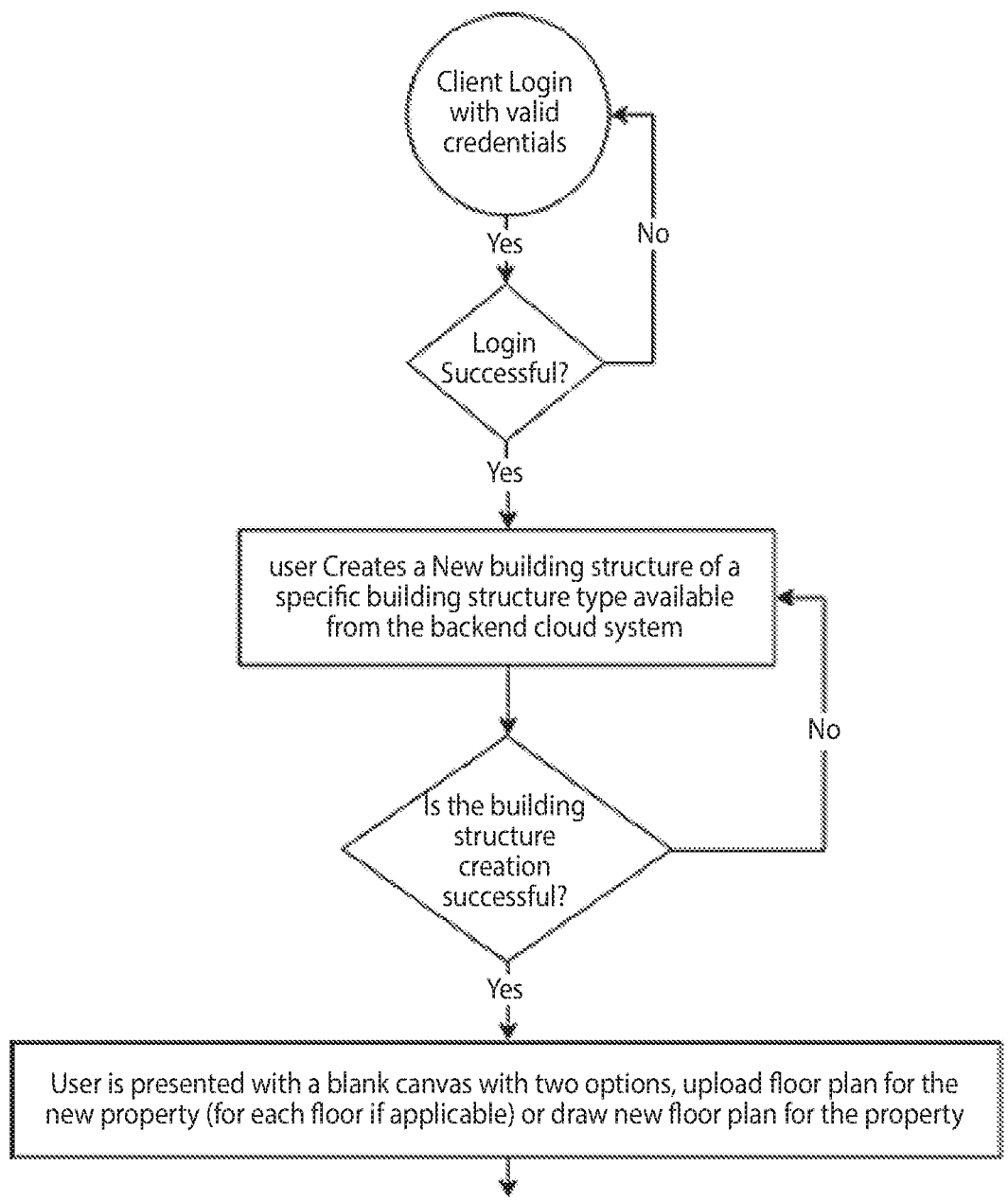
FIG. 4 is a flowchart showing an embodiment of a space configuration flow for servicing.
Figure 4:
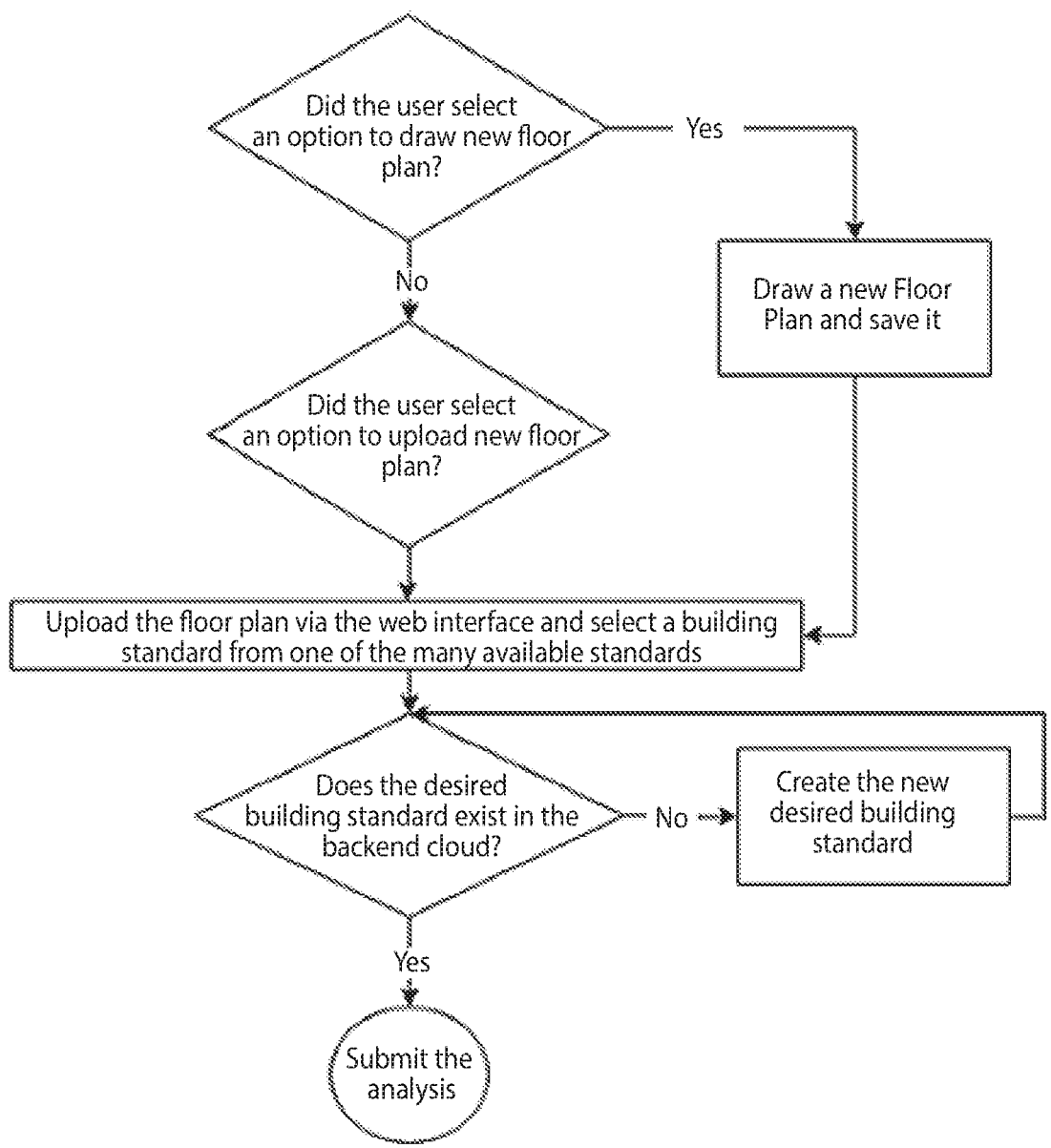
Figure 5:
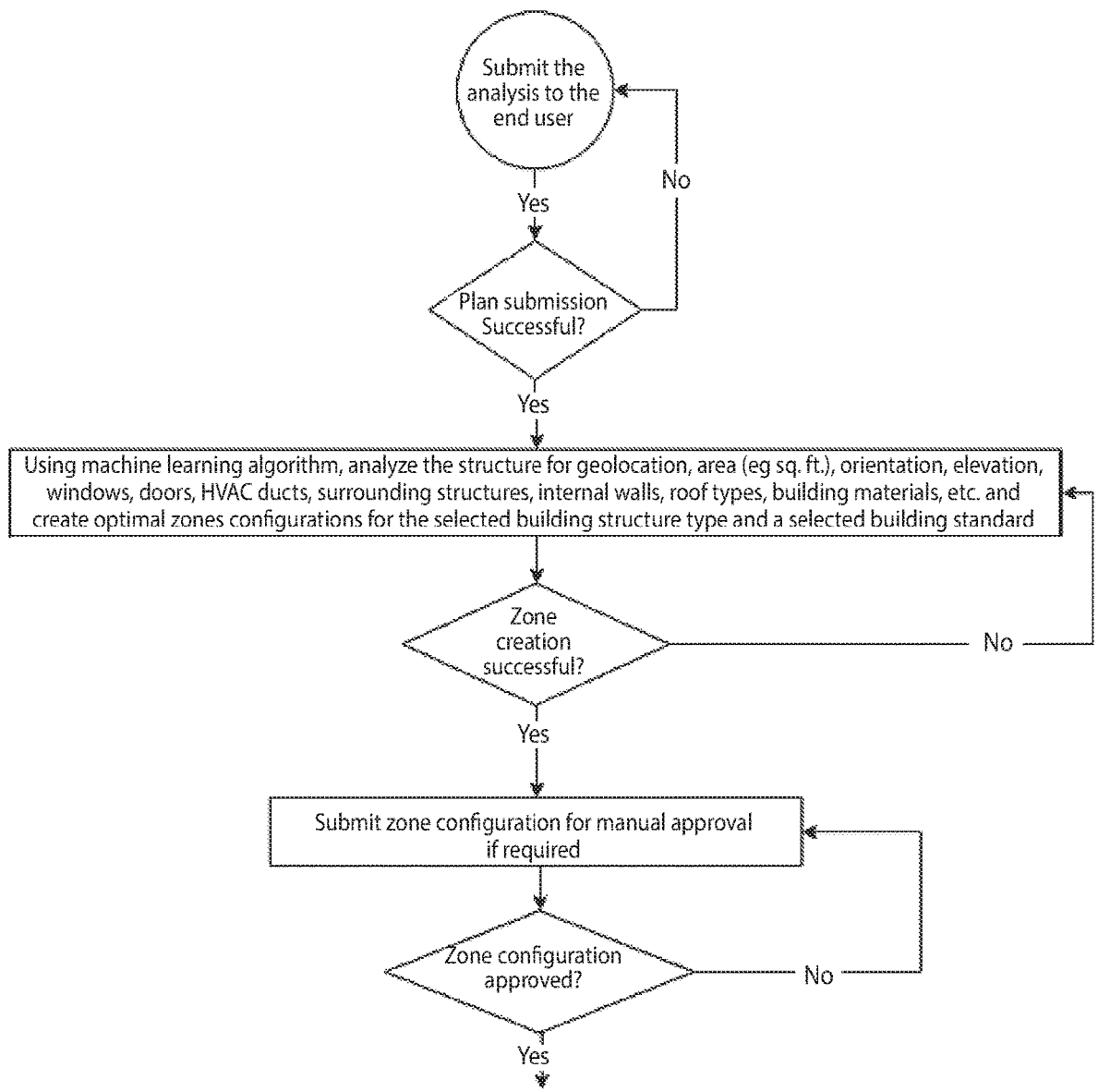
FIG. 5 is a flowchart depicting an embodiment of a space configuration flow for floor plan analysis.
Figure 5:
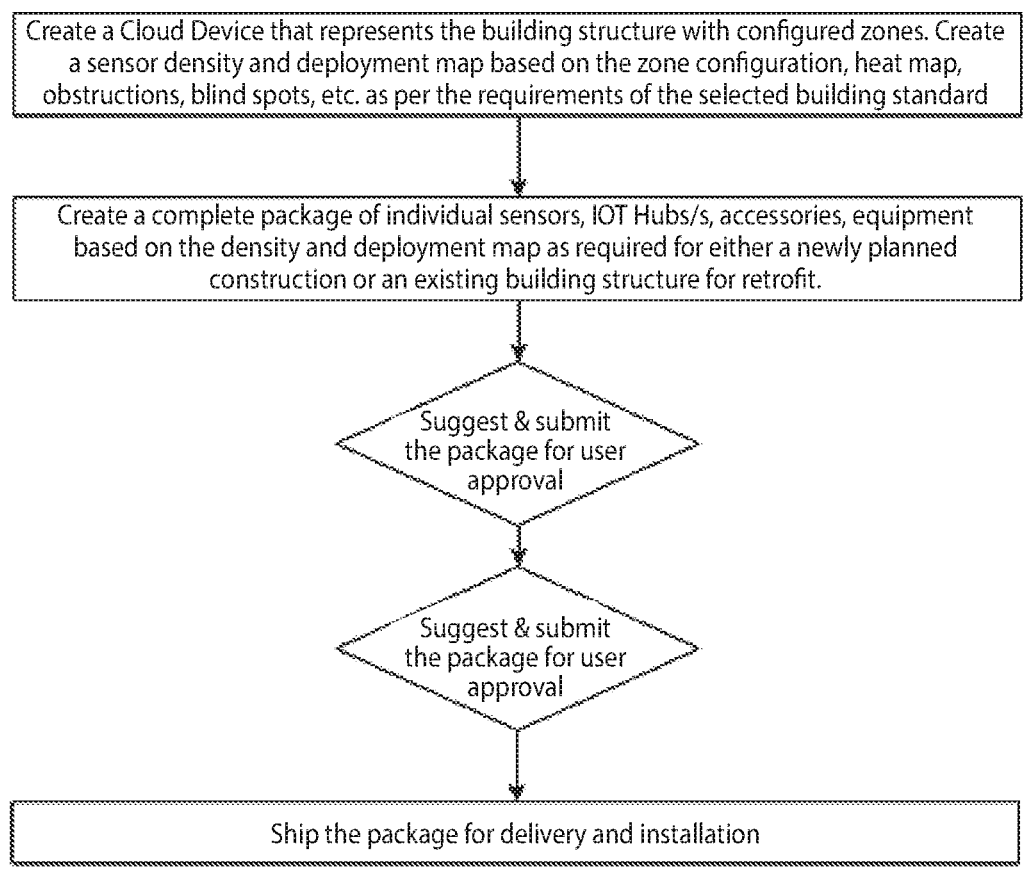

As depicted in FIG. 4 and FIG. 5, certain embodiments provide techniques and methods that make use of machine learning algorithms and rule based expert systems that enable the consumer of the application to upload a floor plan for any building structure or any open environment location into the application using any device agnostic interface. The backend Cloud then analyzes the floor plan or open space specifications and then builds a Cloud Device that represents said building structure or open space as a customized Cloud Device. The machine learning algorithm then works in conjunction with the product catalog to generate proprietary tags for an optimal IOT ecosystem that is customized for the uploaded building and/or space. Using the newly created proprietary tags, the backend Cloud then creates a sensor package configuration by selecting appropriate sensors that match the tags created specifically for the optimal configuration along with suggestions for other optional accessories, equipment and appliances (again using appropriate tags).

With configuration parameter based customization of Cloud Devices, as opposed to the building of a software system for every new type of building structure, certain embodiments along with other embodiments described earlier as they relate to building structures, open spaces, user roles, and permission structure, automates a large part of the servicing, installation, monitoring and maintenance of the IOT ecosystem thereby providing a unique approach to scaling any IOT system built using Cloud Devices, regardless of the type of property or the selected building/health standards. The methods and techniques describe herein enable us to model any type of building structure or spaces described herein, such as, but not limited to, single and multifamily homes, corporate office environments, warehouses, outdoor community environments or any other environment can be expressed as a confined space in a three dimensional space.

FIG. 6 shows an example user flow for provisioning and re-provisioning a Cloud Device. In an example embodiment, a set of characteristics, configurations, and physical locations are determined for single or multiple devices (i.e., at least one device) connected via a computer network. A set of requirements for discovering and provisioning one or more networked connected devices are then identified. A set of policies and a set of best practices will then be used to identify an optimum configuration and/or physical location of the device for provisioning one or more of said devices on the network according to the set of requirements. Based on the configuration, a plan is generated that indicates a data flow through which the set of computing resources that minimizes the potential for error in provisioning and configuring one or more of the devices on the network.

In another embodiment, upon successful provisioning and configuration of the devices onto the network, a set of static and transient physical locations of the devices based on configuration policies and best practices, is used in configuring and determining an optimal and permanent final physical location of the device for optimal operation and maintenance of the provisioned and configured single or multiple devices for the purposes of obtaining highly accurate and precise data points at a maximum throughput.

In still another embodiment, upon successful provisioning and configuration of the device(s(onto the network, a set of time-scheduled based configuration policies and a set of best practices is used in the operation and maintenance of the provisioned and configured device(s), for optimal and efficient operation of the connected device(s).

In yet another embodiment, upon successful provisioning and configuration of the devices onto the network, multiple sets of alternate physical device locations and orientation policies are used in locating and relocating said devices to utilize alternate physical locations for highly accurate and maximum throughput for the devices being configured.

In another embodiment, using the state altering actions described above, these network protocol agnostic devices can change their appearance on a network, such as from being an active to de-active, from being unregistered to registered, or from being unauthenticated to authenticated.

Although the foregoing embodiments have been described in some detail by way of illustration and example for purposes of clarity and understanding, it will be clear to one of skill in the art that certain changes and modifications may be practiced within the scope of the invention which is limited solely by the appended claims.

I claim:

1. A network-connected Cloud-enabled system, comprising:
    at least one Cloud Device residing in a computer network and implementing lightweight functionality provided by a physical device;
    a backend Cloud implementing heavy-duty computing functionality;
    a first software program residing on the Cloud Device and communicating with the backend Cloud using a context switching event-based low latency connection; and
    a second software program residing on the backend Cloud and implementing heavy-duty computing functionality;
    wherein the system partitions full-functional specifications of the Cloud Device to two process spaces such that the Cloud Device implements the lightweight functionality and the backend Cloud implements the heavy-duty functionality;
    wherein the Cloud Device is a fully functional standalone software service application programing interface and works as a counterpart of the backend Cloud;
    wherein the Cloud Device is powered by the compute and storage power of the backend Cloud to service the network-connected Cloud-enabled system with minimal to no manual intervention; and
    wherein data generated by the backend Cloud is accessed by the Cloud Device via a low latency Cloud Client Access application programming interface (CAPI).

2. The system of claim 1, wherein the Cloud Device runs in a self-contained operating system (OS) container.

3. The system of claim 2, wherein the self-contained OS container is a Docker.

4. The system of claim 1, wherein the low latency CAPI access mechanism is implemented by using an event-based mechanism that uses a TCP/IP socket.

5. The system of claim 1, wherein the Cloud Device makes internal use of machine-states to represent behavior to internal and external actions or triggers from other Cloud Devices or third-party systems.

6. The system of claim 1, wherein the Cloud Devices communicate with each other via wired or wireless channels using a standard transport protocol selected from a group consisting of Ethernet, Wi-Fi, Bluetooth, Bluetooth LE, ZigBee, MQTT, and Bacnet.

7. The system of claim 1, wherein the Cloud Device comprises Action Event Dispatcher (AED) which converts received or newly created tasks and changes them into machine instructions to be dispatched to the backend Cloud.

8. The system of claim 1, wherein the Cloud Device creates a unique communication channel with a unique channel ID for communication with the backend Cloud through a session managed authentication handshake.

9. An Internet of Things (TOT) ecosystem for building or home automation, comprising:
    at least one Cloud Device residing in a IOT Hub and representing a local compute component;
    a backend Cloud implementing heavy-duty computing functionality;
    a first software program residing on the Cloud Device and communicating with the backend Cloud using a context switching event-based low latency connection; and
    a second software program residing on the backend Cloud and implementing heavy-duty computing functionality;
    wherein the ecosystem partitions full-functional specifications of the Cloud Device to two process spaces such that the Cloud Device implements the lightweight functionality and the backend Cloud implements the heavy-duty functionality;
    wherein the Cloud Device is a fully functional standalone software service application programing interface and works as a counterpart of the backend Cloud;
    wherein the Cloud Device is powered by the compute and storage power of the backend Cloud to service the network-connected Cloud-enabled system with minimal to no manual intervention;
    wherein data generated by the backend Cloud is accessed by the Cloud Device via a low latency Cloud Client Access application programming interface (CAPI); and
    wherein the IOT Hub allows the Cloud Device to act as an end point for issuing commands if the connection to the backend Cloud is lost.

10. The ecosystem of claim 9, wherein the Cloud Device runs in a self-contained operating system (OS) container.

11. The ecosystem of claim 10, wherein the self-contained OS container is a Docker.

12. The ecosystem of claim 9, wherein the low latency CAPI access mechanism is implemented by using an event-based mechanism that uses a TCP/IP socket.

13. The ecosystem of claim 9, wherein the Cloud Device makes internal use of machine-states to represent behavior to internal and external actions or triggers from other Cloud Devices or third-party systems.

14. The ecosystem of claim 9, wherein the Cloud Devices communicate with each other via wired or wireless channels using a standard transport protocol selected from a group consisting of Ethernet, Wi-Fi, Bluetooth, Bluetooth LE, ZigBee, MQTT, and Bacnet.

15. The ecosystem of claim 9, wherein the Cloud Device comprises Action Event Dispatcher (AED) which converts received or newly created tasks and changes them into machine instructions to be dispatched to the backend Cloud.

16. The ecosystem of claim 9, wherein the Cloud Device creates a unique communication channel with a unique channel ID for communication with the backend Cloud through a session managed authentication handshake.

17. The ecosystem of claim 16, wherein the unique ID based communication channel allows for deploying and identifying one IOT Hub as a backup for a primary IOT Hub.

18. The ecosystem of claim 9, wherein the ecosystem makes use of Cloud Device calendar functionality to schedule events and calendars specific to the IOT Hub or the Cloud Device built for User Interface Actors to allow for scheduling both human and physical resources.

19. The ecosystem of claim 9, wherein one IOT ecosystem is used by a zone of a small space in a building.

20. The ecosystem of claim 9, wherein one IOT ecosystem is shared by multiple zones of a small space in a building.

21. The ecosystem of claim 9, wherein the ecosystem allows the backend Cloud to build a new customized IOT ecosystem based on an uploaded floor plan for a building structure by use of machine learning algorithms.

22. The ecosystem of claim 21, wherein the machine learning algorithms generate tags for the customized IOT ecosystem.

23. The ecosystem of claim 22, wherein the backend Cloud creates a sensor package configuration by selecting sensors that match the tags generated for the customized IOT ecosystem and suggestions for optional sensors.

\* \* \* \* \*